United States Patent [19]

Norton

[11] Patent Number: 4,577,716
[45] Date of Patent: Mar. 25, 1986

[54] SERVO STEERING SYSTEM

[76] Inventor: Peter Norton, 170 Beaver Brook, Lincoln Park, N.J. 07035

[21] Appl. No.: 623,203

[22] Filed: Jun. 21, 1984

[51] Int. Cl.⁴ ............................................. B62D 5/04
[52] U.S. Cl. .................................. 180/79.1; 180/142; 74/388 PS
[58] Field of Search ..................... 180/79.3, 79.1, 141, 180/142; 74/99 R, 100 R, 388 R, 388 PS

[56] References Cited

U.S. PATENT DOCUMENTS

| | | | |
|---|---|---|---|
| 2,362,930 | 11/1944 | Robbins | 180/147 |
| 2,930,359 | 3/1960 | MacDuff | 74/388 PS |
| 4,173,265 | 11/1979 | Kremer | 180/79.1 |
| 4,250,765 | 2/1981 | Niklaus et al. | 74/388 PS |
| 4,409,503 | 10/1983 | Barthelemy | 74/388 R |
| 4,448,275 | 5/1984 | Kitagawa et al. | 180/142 |

Primary Examiner—Craig R. Feinberg
Assistant Examiner—David A. Okonsky
Attorney, Agent, or Firm—Reising, Ethington, Barnard, Perry & Milton

[57] ABSTRACT

A power steering system for vehicles is disclosed using an electric servomotor. The servomotor is energized for power assist in executing turns and for reducing the drag of the servomotor during the return of the dirigible wheels to the straight ahead position. A torque transducer operatively coupled with the steering wheel shaft and the steering gear generates a torque signal corresponding to the torque applied by the driver to the steering wheel. A lost motion coupling is provided between the servomotor and the steering gear and a lost motion transducer is operatively coupled therewith to develop a signal corresponding to lost motion. The torque signal and the lost motion signal are combined differentially and the resultant signal is applied to the servo amplifier for energization of the servomotor. When the driver turns the steering wheel, the torque signal predominates and the servomotor is energized to provide power assist. When the driver releases the steering wheel, the torque signal drops to zero and the lost motion signal controls the energization of the servomotor to overcome its resistance to the return of the dirigible wheels to the straight ahead position. A second configuration provides a compact unit of cylindrical symmetry.

26 Claims, 12 Drawing Figures

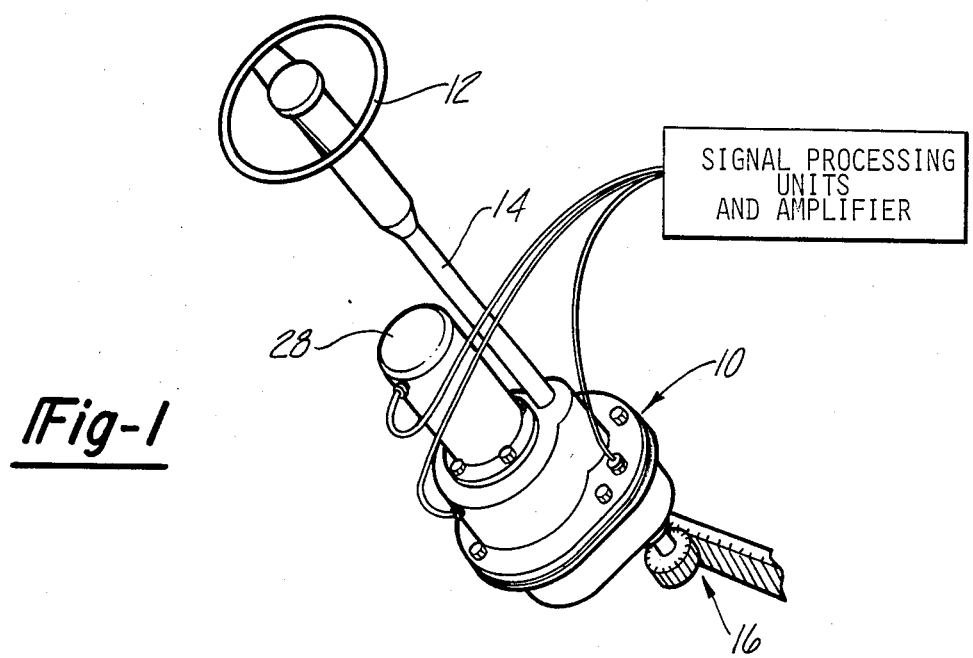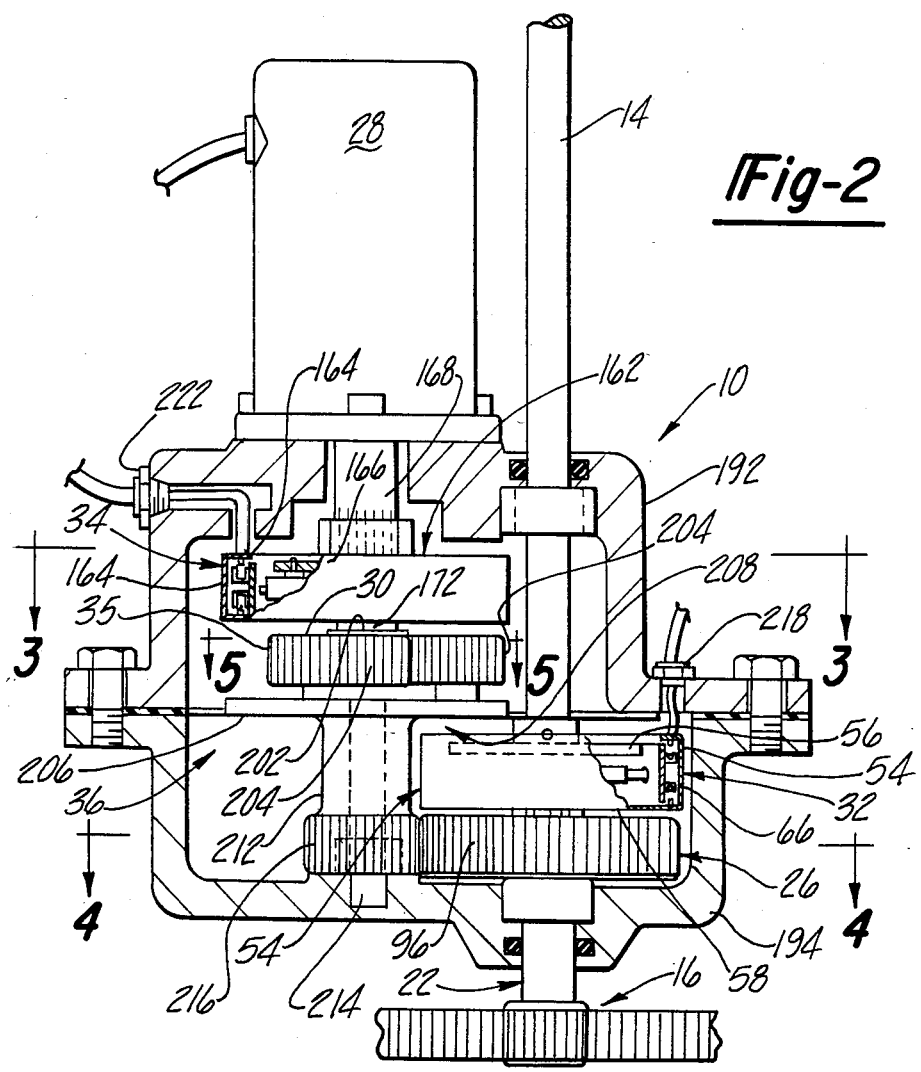

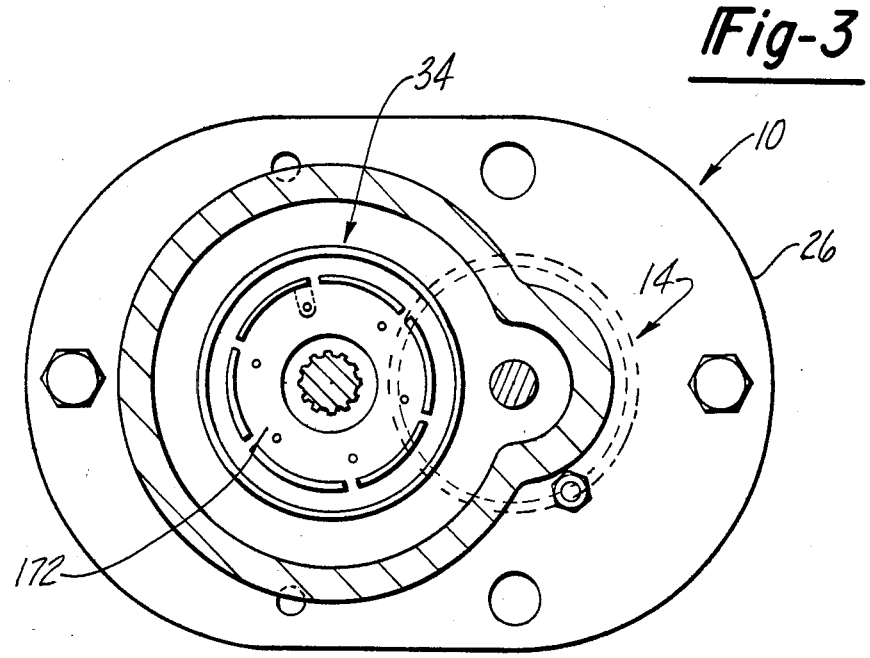
Fig-3
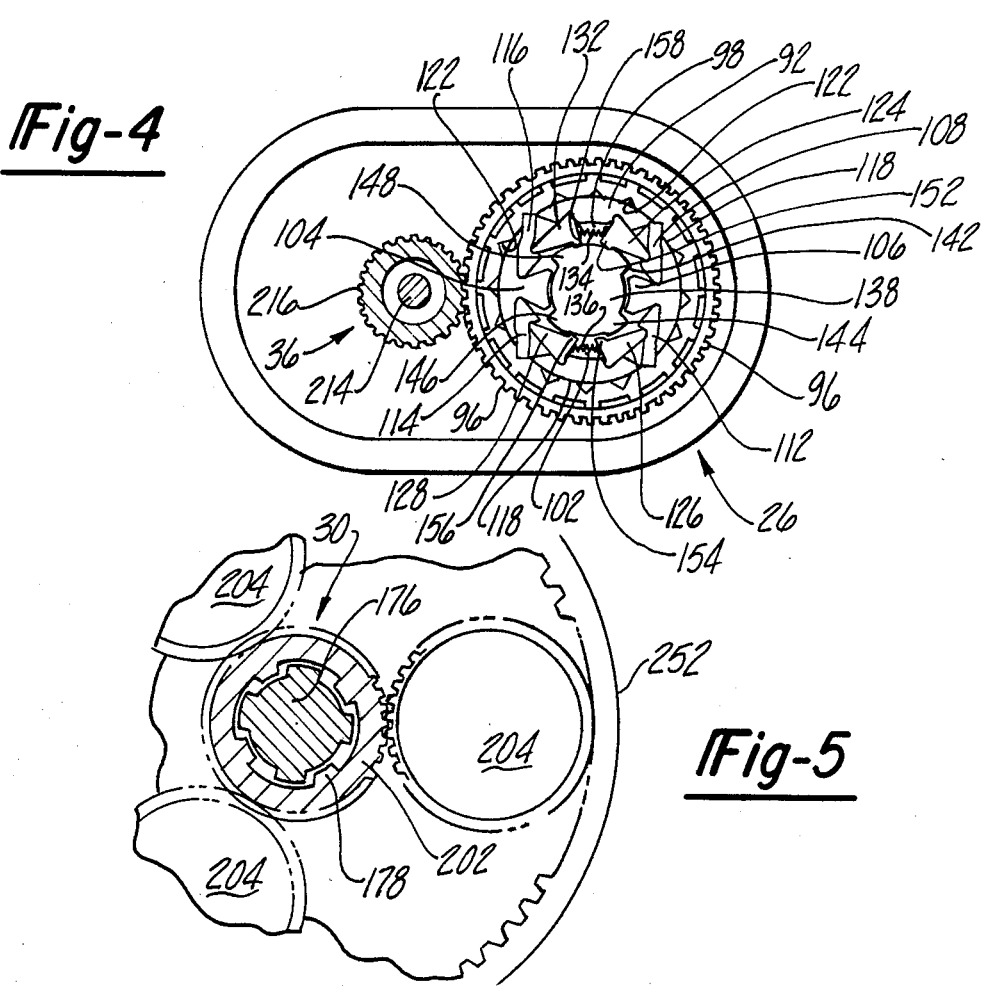
Fig-4
Fig-5

1

SERVO STEERING SYSTEM

FIELD OF THE INVENTION

This invention relates to vehicle power steering systems; more particularly, it relates to a control system for returning an electric power steering servo to the straight ahead position.

BACKGROUND OF THE INVENTION

In general, a power steering system for an automotive vehicle comprises a servomotor which is controlled by the steering wheel for turning the dirigible wheels. Hydraulic servomotors are conventionally used and it is also known to utilize an electric servomotor.

In conventional vehicle steering systems, it is desirable for the dirigible wheels of the vehicle to automatically return to the straight ahead position after the driver has executed a turn and releases the steering wheel. In the conventional system, this is realized as the result of the geometry of the steering system. In particular, with the vehicle moving forward and the front wheels turned, the road forces acting on the front wheels tend to turn the front wheels back to the straight ahead position. This restoring force which originates from the reaction of the front wheels with the road surface, is transmitted through the steering linkage to the steering gear. Rotation of the steering gear to the straight ahead position is effective to drive the steering shaft and steering wheel to the straight ahead position. It also tends to drive the servomotor to the straight ahead position. In the case of an hydraulic servomotor the drag forces are compensated by changing the steering geometry to increase the restoring force. However, in the case of an electric servomotor, the resisting force due to friction in the servomotor is substantial in relation to the restoring force. Without special measures, the resisting force or drag imposed by the electric servomotor has the effect of slowing the return of the front wheels to the straight ahead position. The drag may be large enough that a manual assist through the steering wheel becomes necessary to turn the front wheels to the straight ahead position.

A general object of this invention is to provide a control system for reducing the drag of the servomotor and gear train on the return of the dirigible wheels to the straight ahead position to include this capability in a power steering system in a neat and compact structure and to overcome certain disadvantages of the prior art.

SUMMARY OF THE INVENTION

In accordance with this invention, a vehicle power steering system with an electric servomotor is provided with means for reducing the drag imposed by the servomotor in the turning of the dirigible wheels toward the straight ahead direction. This is accomplished by controlled energization of the servomotor for both power assist in turning and reduction of drag in returning to the straight ahead position.

Further, in accordance with this invention, the servomotor itself is utilized for the reduction of drag imposed by the servomotor. This is accomplished by producing a control signal in response to rotational effort being applied from the dirigible wheels to the servomotor and energizing the servomotor in accordance with the control signal. More particularly, the servomotor is coupled to the steering gear through a lost motion coupling and a signal generating means is provided for generating a lost motion signal in response to the lost motion travel in the coupling. Control means responsive to the lost motion signal controls the energization of the servomotor whereby it is energized to reduce its resistance to the turning of the dirigible wheels toward the straight ahead direction when there is no manual turning effort applied by the driver to the steering wheel. Further, according to this invention, the control means is adapted to control the energization of the servomotor in accordance with a torque signal corresponding to the torque transmitted by the steering wheel; the servomotor is energized in response to the lost motion signal to the extent required to overcome frictional losses when the torque signal is zero. More particularly, the control means comprises means for differentially combining the lost motion signal and the torque signal for developing a modified torque signal for application to an amplifier for controlling the energization of the servomotor. Further, in accordance with this invention, an angular motion to linear motion converter is provided for generating a lost motion signal.

Further, in accordance with this invention, a power steering unit is provided which incorporates the invention as aforesaid and which is symmetrical about the steering wheel shaft.

A more complete understanding of this invention may be obtained from the detailed description that follows taken with the accompanying drawings.

DESCRIPTION OF THE DRAWINGS

FIG. 1 is a perspective view of one embodiment of this invention in a power steering system for a vehicle;

FIG. 2 is a view, partially in section, of the power steering unit of FIG. 1;

FIG. 3 is a view taken on lines 3—3 of FIG. 2;

FIG. 4 is a view taken on lines 4—4 of FIG. 2;

FIG. 5 is a view taken on lines 5—5 of FIG. 2;

FIG. 11 is a view taken on lines 11—11 of FIG. 10;

FIG. 12 is a view taken on lines 12—12 of FIG. 10.

BEST MODE FOR CARRYING OUT THE INVENTION

Figure 6:
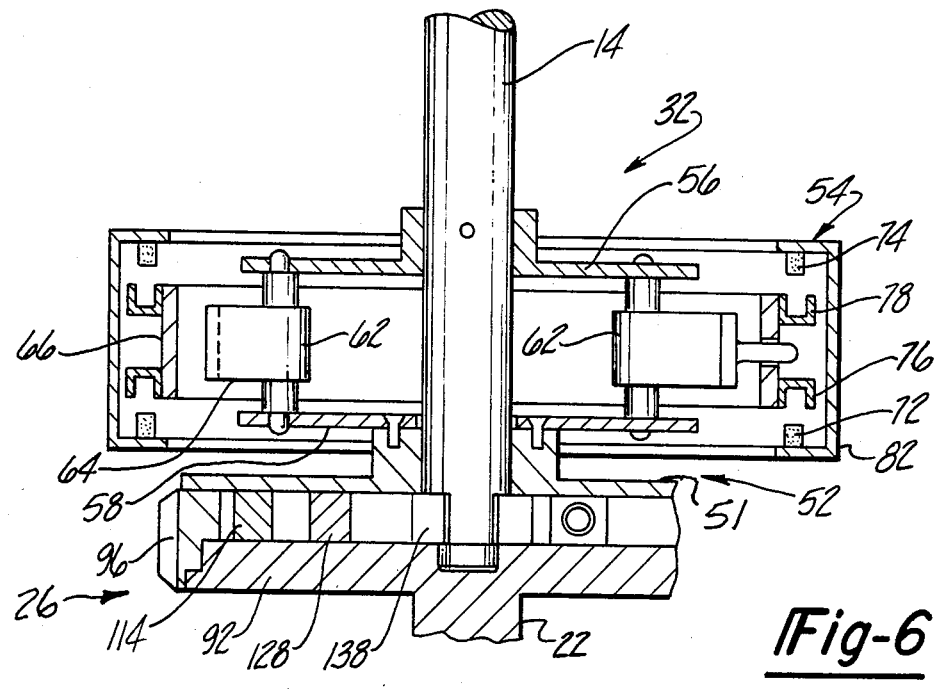
FIG. 6 shows a torque transducer for the power steering unit.

Referring now to the drawings, the invention is shown in two illustrative embodiments in a power steering unit for a vehicle. Each of the illustrative embodiments represents a particular design, including a particular configuration and structure, especially suited for automotive application. It will be appreciated, as the description proceeds, that the invention may be embodied in other designs and used in other applications.

FIG. 1 of the drawings shows the power steering unit 10 of this invention installed in a typical automotive steering system. In general, the steering system comprises a steering wheel 12 which is connected through an upper steering shaft 14 to a steering gear 16. The steering gear 16 is operatively connected with the dirigible wheels of the vehicle for displacing the wheels in accordance with the rotative position of the steering wheel 12. The power steering unit 10 is interposed between the steering wheel 14 and the steering gear 16. The power steering unit 10 is provided with a servo system drive connection with the steering gear 16 and, for fail-safe purposes, it is also provided with a manual drive connection with the steering gear 16.

The power steering unit 10 will now be described in detail with reference to FIGS. 2, 3, 4 and 5. The upper steering shaft 14 and a lower steering shaft 22 are connected together by a drive transmitting, fail-safe coupling 26. The coupling includes a lost motion coupling which provides an unyielding coupling between the shafts 14 and 22. The shaft 14 constitutes a manually actuated control member for the fail-safe drive transmitting coupling 26. The coupling 26 is adapted under certain circumstances to transmit torque from the upper steering shaft 14 to the lower steering shaft 22. It is also adapted, under certain circumstances, to transmit torque from a servomotor 28 to the lower steering shaft 22. The drive transmitting coupling 26 will be described in more detail subsequently. A torque transducer 32 is operatively associated with the upper shaft 14 and lower shaft 22 and is adapted to develop an electric signal corresponding to the relative angular displacement therebetween and hence the turning effort or torque applied to the steering wheel 12 by the driver. The torque transducer 32 will be described in greater detail subsequently.

The servomotor 28, which is a reversible electric motor, is connected through a lost motion coupling 30 and a gear set 36 to the drive transmitting coupling 26 and thence to the steering gear 16. A lost motion transducer 34 is operatively associated with the lost motion coupling 30 and generates a signal corresponding to lost motion.

Figure 7:
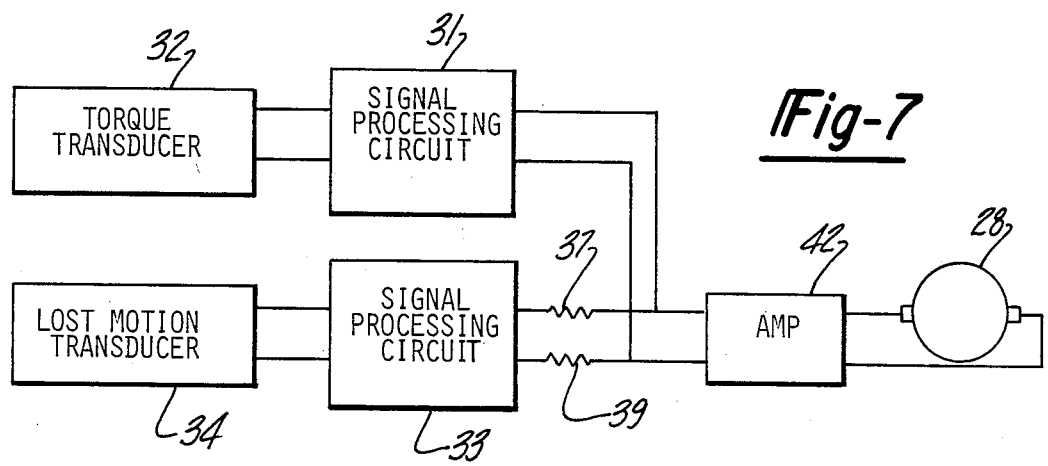
FIG. 7 is a block diagram of the servo system.

The servo system is shown in block diagram in FIG. 7. It comprises, in general, the torque transducer 32, lost motion transducer 34, a servo amplifier 42 and the servomotor 28. The torque transducer 32 is coupled to a signal processing circuit 31 which develops a torque signal which is applied to the input of amplifier 42. Similarly, the lost motion transducer is coupled to a signal processing circuit 33 which develops a lost motion signal. The lost motion signal is at all times a small signal; this is indicated schematically by including attenuating resistors 37 and 39. This signal is combined differentially with the torque signal at the input of the amplifier 42. The servo system will be described in greater detail subsequently; for present purposes, suffice it so say that the torque signal is applied to the input of the servo amplifier 42 which controls the energization of the motor 28. The motor 28 operates through the lost motion coupling 30, the gear set 36 and the drive transmitting coupling 26 to actuate the steering gear 16 in accordance with the driver applied torque. In accordance with this invention, the lost motion transducer 34 generates a lost motion signal corresponding to the lost motion in the coupling 30. The lost motion signal is combined with the torque signal for developing the modified torque signal at the input of the amplifier 42. As a result, the servomotor is energized to reduce its resistance to the turning of the dirigible wheels toward the straight ahead direction when the torque signal is zero.

Before proceeding with a more detailed description of the power steering unit 10, it will be helpful to consider the torque transducer 32 as shown in FIG. 6. This transducer includes a motion converter of the type which is described and claimed in co-pending application Ser. No. 423,509 filed on Sept. 27, 1982, by the same inventor as this application. The torque transducer 32 comprises, in general, a motion converter 52 and a linear displacement sensor 54. The motion converter 52 has an input member 56 which is connected with the upper shaft 14 for rotation therewith. It also comprises an input member 58 which is operatively connected with the lower shaft 22 for rotation therewith. There is a certain amount of torsional elasticity in the motion converter so the relative rotation of the upper and lower shafts corresponds to the torque applied to the steering wheel by the driver. This is accomplished by attaching input member 58 to cover 51 of drive transmitting coupling 26 by threaded fasteners, as shown. The cover 51 is attached to coupling block 92 (by means not shown) which is unitary with lower shaft 22. (Alternatively, a motion converter or other angular displacement sensor of small torsional stiffness may be used and a torsionally elastic shaft with the desired stiffness may be connected between the upper and lower shafts 14 and 22.) The input members 56 and 58 are coupled together by a set of links 62 which extend in an axial direction between the input members. Each link is provided with an amplifying arm 64 extending transversely of the link. An output member in the form of a carrier ring 66 is mounted on the free ends of the amplifying arms for movement therewith. In operation of the motion converter 52, the links 62, arms 64 and the ring 66 are positioned as shown in FIG. 6 with the input members 56 and 58 in a reference position, i.e. no relative angular displacement. If a clockwise torque is applied to the steering wheel 12 the input member 56 will be rotated in a clockwise direction relative to the input member 58. This will cause the links 62 to be inclined relative to the input member by reason of the flexure of the joints of the links with the input members. Accordingly, the amplifying arms 64 will be deflected upwardly by reason of the movement of the respective links. The arms 64 will be deflected in unison and the carrier ring 66 will be moved linearly along the axis of the angular displacement. If, on the other hand, a counterclockwise torque is applied to the steering wheel 12 the input member 56 will be rotated in a counterclockwise direction relative to the input member 58. This will cause the links 62 to be inclined in the other direction and the amplifying arms 64, and hence the carrier ring 66, will be deflected downwardly.

The linear displacement sensor 54 is of the variable inductance type and comprises a pair of coils 72 and 74. The inductance of the first coil 72 is influenced by an annular core member 76 of annular configuration which is mounted on the carrier ring 66 for movement therewith. The inductance of the second coil 74 is influenced by an annular core member 78 which is also mounted on the carrier ring 66 for movement therewith. The coils 72 and 74 are mounted on a coil support member 82 which is stationary. The inductance of each of the coils 72 and 74 varies with the proximity of the core members 76 and 78, respectively, and hence in accordance with the relative angular displacement of the upper shaft 18 and the lower shaft 22. The torque transducer 31 is coupled with the signal processing circuit 33 which is responsive to the inductance variation of the coils 72 and 74 to produce a signal voltage corresponding to the driver applied torque.

The drive transmitting coupling 26 will now be described in greater detail with reference to FIGS. 4 and 6. This drive transmitting coupling is suitably of the type disclosed and claimed in copending application Ser. No. 533,443 filed Sept. 19, 1983, by the same inventor as in this application. The drive transmitting coupling 26 comprises, in general, a coupling block 92 which is connected through a shaft 22 with the steering gear 16. A ring gear 96 is rotatably mounted on the peripheral surface of the coupling block 92 and is driven by the output of the gear set 35 which is connected to the servomotor 28. The coupling block 92 is an annular member and includes two opposing compartments 98 and 102 which are separated by internal diametrically opposed abutments or stop flanges 104 and 106. A set of elongated pawls 108, 112, 114 and 116 are rotatably fitted within the compartment to pivot in respective seating pockets formed in the stop flanges 104 and 106. The outer end of each pawl is formed with a flat end to engage teeth 118 and fit into triangular notches 122 which are formed between the teeth on the inside surface of the ring gear 96. Each tooth 118 is symmetrical about a radius line of the ring gear and the notches are equally spaced along the surface of the gear so that the pawls engage whichever notches are adjacent to them at any particular time. The pawls operate as unidirectional connectors, i.e. pawls 108 and 114 positively lock the coupling block 92 and the ring gear 96 together for rotation in one direction but release, in a ratchet-like action, in the event of opposite relative rotation of the gear upon the coupling block. Conversely, the pawls 112 and 116 lock the ring gear 96 to the coupling block 92 for rotation in the other direction with ratcheting when the rotation is reversed. Consequently, by retracting pawls 108 and 114, or alternatively by retracting pawls 112 and 116, the ring gear 96 will be locked to the coupling block 92 for drive in one direction but will slip if the drive direction is reversed.

The pawls 108, 112, 114 and 116 are actuated by intermediate actuators 124, 126, 128 and 132, respectively. The intermediate actuators are generally triangular in configuration and each has a rounded corner in pivotal engagement with a seating pocket in the coupling block 92. Another rounded corner of each actuator is pivotally engaged with a corresponding pawl in a seating pocket thereof. A spring 134 acts between the actuators 124 and 132 and urges them apart thereby urging the respective pawls into engagement with the triangular notches in the ring gear 96. Similarly, a spring 136 urges the actuators 126 and 128 apart and the pawls 112 and 114 are thereby urged outwardly to engage notches in the ring gear 96. Thus, the pawls 108, 112, 114 and 116 are normally extended outwardly into locking position.

As shown in FIG. 6, the upper shaft 14 terminates in a central actuator 138 which is located within the coupling block 92. The central actuator 138 fits into a central recessed portion located between the stop flanges 104 and 106. The central actuator 138 is provided with teeth 142, 144, 146 and 148 which are adapted to engage tabs 152, 154, 156 and 158, respectively, on the intermediate actuators 124, 126, 128 and 132. Consequently, rotation of the shaft 14 relative to the coupling block in one direction causes the teeth 144 and 148 to engage the tabs 154 and 158 respectively thereby rotating the respective actuators 126 and 132 causing the respective pawls 112 and 116 to rotate out of their engaged positions with the teeth of the ring gear 96. Rotation of the shaft 14 in the other direction causes the teeth 142 and 146 to engage the tabs 152 and 156, respectively, thereby rotating the respective actuators 124 and 128 to cause the pawls 108 and 114 to rotate out of their engaged positions with the ring gear 96.

The operation of the drive transmitting coupling 26 is as follows. With the parts of the drive transmitting coupling 26 in the positions as shown in FIG. 4, the pawls 108, 112, 114 and 116 are seated in the triangular notches 122 in the ring gear 96 and thereby lock the ring gear to the coupling block 92 for rotation in either a clockwise or counter clockwise direction. In normal operation, the driver turns the steering wheel 12 in either direction and the angular displacement sensor generates a corresponding torque signal which is applied to the amplifier 42 which energizes the servomotor 28. The servomotor transmits power through the gear set 36 to the ring gear 96 to rotate it in synchronism with the rotation of the shaft 14 by the steering wheel 12. Thus, the coupling block 92 drives the steering gear 16 for steering the vehicle in accordance with the movement of the steering wheel 12. In the event of a power failure or malfunction, the torque transmitting coupling 26 is operative to provide fail-safe direct manual drive for the steering gear 16 and also to disengage any power drive which might be applied in a direction opposite to the desired turning direction. In case of a partial loss of electrical power, rotation of the steering wheel 12 in a clockwise direction causes the central actuator 138 to rotate clockwise, as viewed in FIG. 4, until the teeth 144 and 148 engage the tabs 154 and 158 to thereby rotate the intermediate actuators 126 and 132 respectively, causing the pawls 112 and 116 to disengage from the teeth in the ring gear 96. The pawls 108 and 114 remain engaged with the ring gear 96 for coupling to the coupling block 92 for power assistance in the clockwise turning direction; however, power assist cannot be applied through the ring gear 96 in the opposite direction since pawls 112 and 116 are disengaged and the pawls 108 and 114 would ratchet over the teeth of the ring gear. Further, the rotation of the central actuator 138 causes the teeth 142 and 146 thereon to engage the stop flanges 106 and 104, respectively. This provides a direct drive connection between the shaft 14 and the coupling block 92 for applying direct manual drive torque from the steering wheel to the steering gear 16. Thus, there is a lost motion connection between the central actuator 138 and the coupling block 92. To the extent that the power assist system is able to produce torque even though at a level insufficient to maintain synchronism, that torque, if applied in the direction of the desired rotation, will assist the turning of the coupling block 92. Conversely, if there is torque applied in the opposing direction, such as due to malfunctioning of the servomotor, then that torque causes idling rotation of the ring gear 96 on the coupling block 92 without transmission of torque. Thus, wrongly directed torque does not oppose or interfere with the direct rotational effort of the direct drive of the steering wheel through the central actuator 138 to the coupling block 92. The operation of the drive transmitting coupling 26 has been described with reference to turning of the steering wheel in the clockwise direction; it will now be appreciated that the coupling operates in an analogous manner when the steering wheel is turned in the counter clockwise direction.

It will now be helpful to consider the structure and operation of the lost motion transducer 34. The lost motion transducer 34 may be of the same type and operating principle as the torque transducer 32 described above. However, the lost motion transducer 34 differs from the torque transducer 32 in that little or no torque results from angular displacement between the input members of the lost motion transducer. Referring now to FIG. 2, the lost motion transducer 34 comprises a motion converter 162 and a linear displacement sensor 164. The motion converter 162 includes an input member 166 which is connected with the motor shaft 168 for rotation therewith. The motion converter also includes an input member 172 which is connected with the sun gear 202 of the planetary gear set 35 for rotation therewith. The lost motion coupling 30 is connected between the motor shaft 168 and the sun gear 202. This coupling allows a predetermined amount of relative motion between shaft 168 and sun gear 202, i.e. lost motion, and also provides a positive mechanical engagement for torque transmission in either direction after the lost motion is taken up. The lost motion coupling 30 as shown in FIG. 5 comprises a splined portion 176 of motor shaft 168 and internal splines 178 in sun gear 202. The splines are spaced to provide lost motion prior to positive driving engagement. The lost motion travel is small relative to one revolution of the shaft 168 of the servomotor 28. The linear displacement sensor 164 of the lost motion transducer 34 may be of the same construction and operating principle as described with reference to the torque transducer 32.

The construction of the overall power steering unit 10 will now be described with reference to FIGS. 2 through 5. The unit 10 comprises an upper housing member 192 and a lower housing member 194 which are bolted together to form a sealed unit. The upper steering shaft 14 extends through the upper housing member 192 and is connected near its lower end with the input member 56 of the torque transducer 32. The upper shaft 14 is connected with the central actuator 138 of the drive transmitting coupling 26, as described above. The coupling block 92 of the coupling 26 is connected through the shaft 22 with the steering gear 16. The servomotor 28 is mounted on the upper housing 192 and the shaft 168 thereof is connected with the input member 166 of the lost motion transducer 34. The other input member 172 of the transducer 34 is connected to the sun gear 202 of planetary gear set 35. The motor shaft 168 is connected to the sun gear 202 through the lost motion torque transmitting coupling 30. The planetary gear set 35 comprises sun gear 202 and planetary gears 204 rotatably mounted on a circular plate 206 of a planetary carrier 208. They mesh with a ring gear 252 which is fixedly mounted in the upper housing member 192. The planetary carrier 208 includes a hollow shaft 212 which is rotatably mounted on a shaft 214 secured to the lower housing member 194 and extending through the hollow shaft 212. The hollow shaft 212 carries a pinion gear 216 which meshes with the ring gear 96 of the torque transmitting coupling 26. The linear displacement sensor 54 of the torque transducer 32 is electrically coupled through an electrical connector 218 to the signal processing circuit 31 previously described with reference to FIG. 7. Similarly, the linear displacement sensor 164 of the lost motion transducer 34 is coupled through a connector 222 to the signal processing circuit 33 previously described with reference to FIG. 7.

Figure 8:
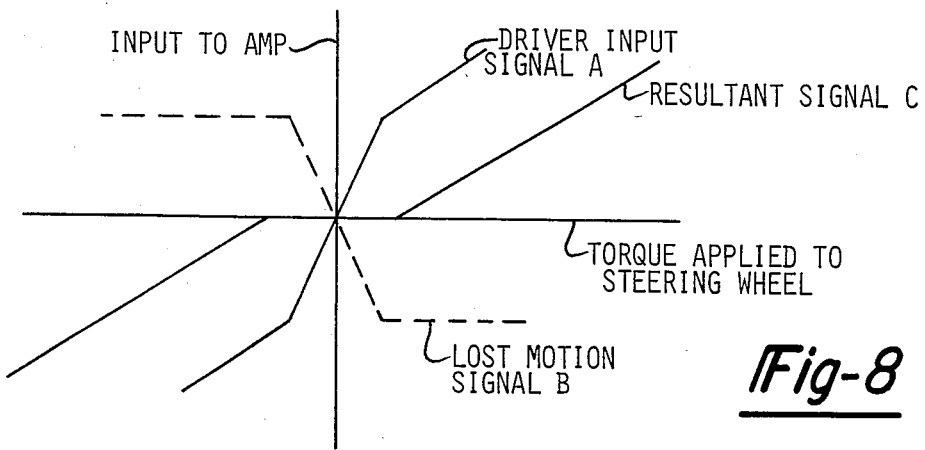
FIG. 8 is a graph for use in describing the servo system.

The operation of the power steering unit 10 will now be described with particular reference to FIGS. 2, 7 and 8. When the driver turns the steering wheel 12 in a clockwise direction for a right-hand turn, the torque transducer 32 develops a signal which is applied to the signal processing circuit 31 and thence to the input of the amplifier 42. The amplifier energizes the servomotor 28 with a resulting relative rotation between the motor shaft 168 and the sun gear 202 by reason of the lost motion coupling 30. When the lost motion is taken up by coupling 30, the sun gear 202 is driven synchronously with the motor shaft 168 which drives the planetary gear set 35 to turn the pinion gear 216 which drives the ring gear 96 of the drive transmitting coupling 26. Consequently, the shaft 22 drives the steering gear 16 in synchronism with the rotation of the upper shaft 14 to execute the right-hand turn. As noted above, the rotation of the servomotor shaft 168 resulted in lost motion in the lost motion coupling 30. Accordingly, the lost motion transducer 34 is caused to develop a lost motion signal corresponding to the extent of lost motion. This lost motion signal is applied from the lost motion transducer 34 to the signal processing circuit 33 and thence through the attenuating resistors 37 and 39 to the input of the amplifier 42. The lost motion signal is combined differentially with the torque signal at the input of the amplifier 42 and consequently, the servomotor 28 is energized in accordance with the signal difference. The operation just described is obtained when the driver applies a normal turning effort to the steering wheel in turning a corner, for example. In such a usual turn, the torque signal predominates over the lost motion signal so that the servomotor is energized sufficiently to provide the power assist desired for turning. (There is a special case of turning with very small amount of turning effort on the steering wheel in which a very low level torque signal is developed; this special case will be discussed subsequently.)

When the right-hand turn has been executed, as described above, the driver will normally release the steering wheel. As described previously, the roadway forces acting on the dirigible wheels of the vehicle tend to return them to the straight ahead position. This turning effort on the dirigible wheels is transmitted through the steering linkage to the steering gear 16 and thence through the drive transmitting coupling 26, gear set 36 and the lost motion coupling 30 to the servomotor 28 tending to return it to the straight ahead position. In this condition, i.e. upon release of the steering wheel by the driver, the torque signal produced by the torque transducer 32 is zero; however, the lost motion signal produced by the lost motion transducer 34 is at its maximum value since the lost motion of the lost motion coupling 176 is fully taken up in executing the right-hand turn. Thus, the lost motion signal alone is applied to the amplifier 42 which energizes the servomotor 28 in a sense opposite that for the right-hand turn. The degree of energization, when the lost motion signal is at its maximum value, is such that the servomotor 28 approximately overcomes its own losses with a sufficient margin to cause rotation of the motor. As the wheels move toward the straight ahead position, the motion will cause the sun gear 202 to rotate; the lost motion transducer 34 will continue to produce a signal that causes energization of the servomotor 26. The energization of the servomotor will rotate it in the direction toward the straight ahead position. Thus, the servomotor is driven so that it follows the rotation of the sun gear 202 and does not resist the return of the wheels to the straight ahead position. It will now be understood that the operation of the power steering unit 10 for a left-hand turn is analogous to that just described for the right-hand turn.

A special case of turning in which a very small or low level driver torque is applied to the steering wheel was alluded to above. This special case will now be described. To simplify this discussion and also simplify FIG. 8 it is assumed that the servo motor operates without friction so that it responds to each infinitesimal input signal with an infinitesimal rotation. Where the torque transducer 32 and its signal processing circuit 31 have an output level similar to that of the lost motion transducer 34 and its processing circuit 33 through resistors 37 and 39, there is a dead zone which results in the absence of power assist when the driver applies a low level torque to the steering wheel. The low level torque on the steering wheel causes the torque transducer 32 to produce a relatively small signal which, through the amplifier 42, energizes the servomotor 28 to provide an initial power assist. Assume that in this initial condition, the lost motion coupling 30 is in a centered position and the lost motion signal from the transducer 34 is zero. As the servomotor shaft rotates, the lost motion in the lost motion coupling 30 is taken up and the lost motion signal increases in amplitude. As the limit of the lost motion coupling 30 is approached, the lost motion signal counteracts the torque signal and, as a result, the servomotor stops turning before it reaches the limit of the lost motion in coupling 30 and thus before it can provide power assist for turning the dirigible wheels. Thus, there is a range of small driver input torques on the steering wheel which cause the servomotor 28 to rotate within the limits of the lost motion in coupling 30 without reaching the limit at which positive drive is provided through the coupling. In certain applications, such a dead zone operation is not objectionable. If desired, power assist will be obtained if the driver merely increases the torque applied to the steering wheel.

In the event that it is desired to diminish the dead zone described above, it may be done in the following manner. The torque transducer 32 and its associated signal processing circuit may be provided with high enough gain in the vicinity of zero torque so that the torque signal will predominate over the lost motion signal for almost all levels of torque applied to the steering wheel. This relationship is illustrated in FIG. 8 wherein the input signals to the amplifier 42 are plotted as a function of the torque applied to the steering wheel. In the graph, the driver input signal A has a steep slope or high gain in the vicinity of zero torque and then changes to a lesser slope at predetermined points. The graph shows the corresponding lost motion signal B from the lost motion transducer 34 and associated signal processing circuit 33. With this relationship of signals, the power steering unit operates with a much smaller dead zone, shown as the horizontal portion of resultant signal C and power assist is provided at almost all levels of torque applied to the steering wheel by the driver.

Figure 9:
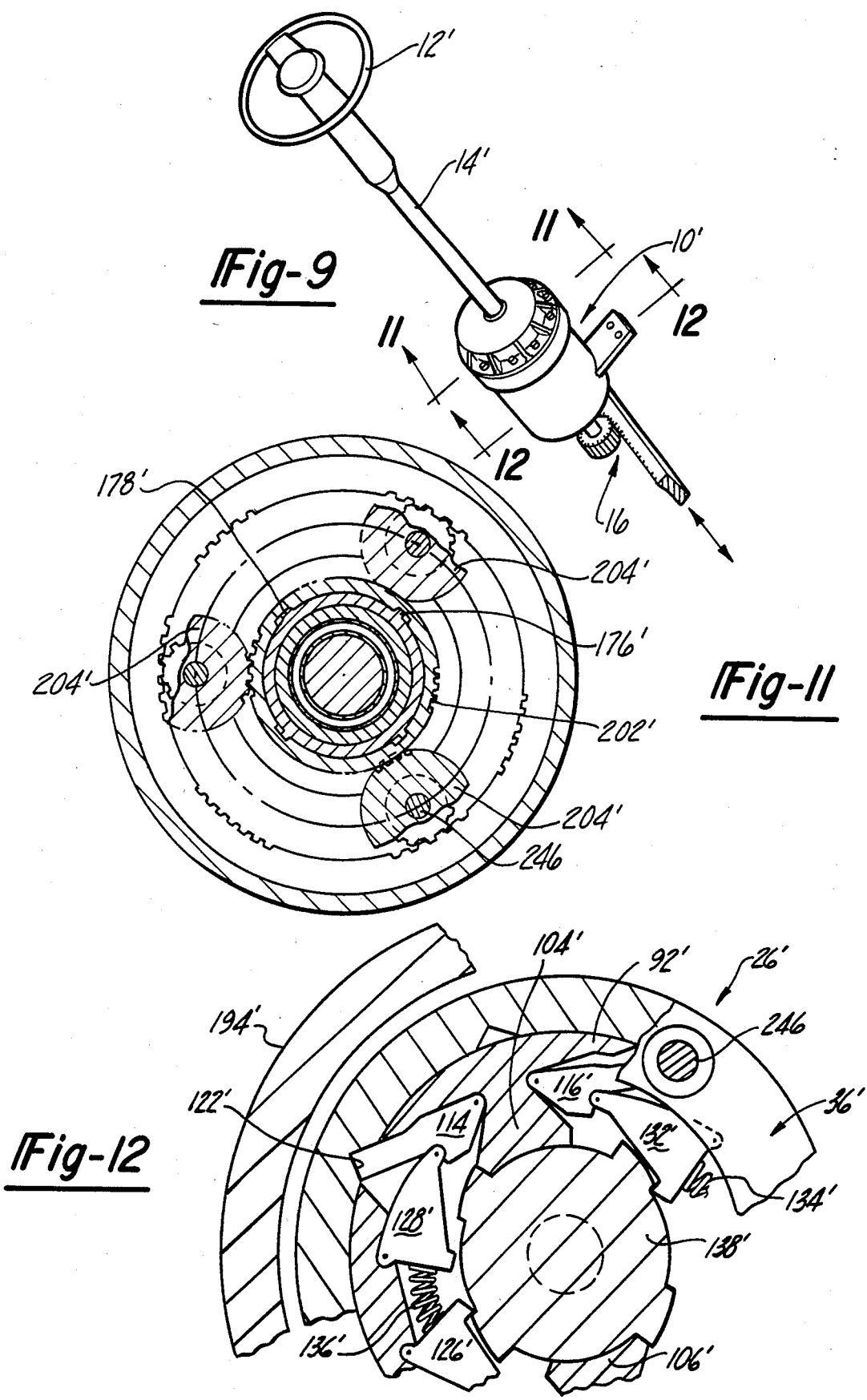
FIG. 9 is a perspective view of another embodiment of the power steering unit of this invention.

FIGS. 9, 10, 11 and 12 show another embodiment of the invention. In this embodiment, the servomotor and the drive train to the steering gear mechanism are coaxial with the steering column. The principle of operation remains the same as that described with reference to the embodiment of FIGS. 1 through 8. As shown in FIG. 9, a power steering unit 10' is interposed between the steering column 14 and the steering gear 16. In the description of the power steering unit 10', parts are designated with the same reference numeral with a prime symbol added to the reference numeral used in the power steering unit 10.

Figure 10:
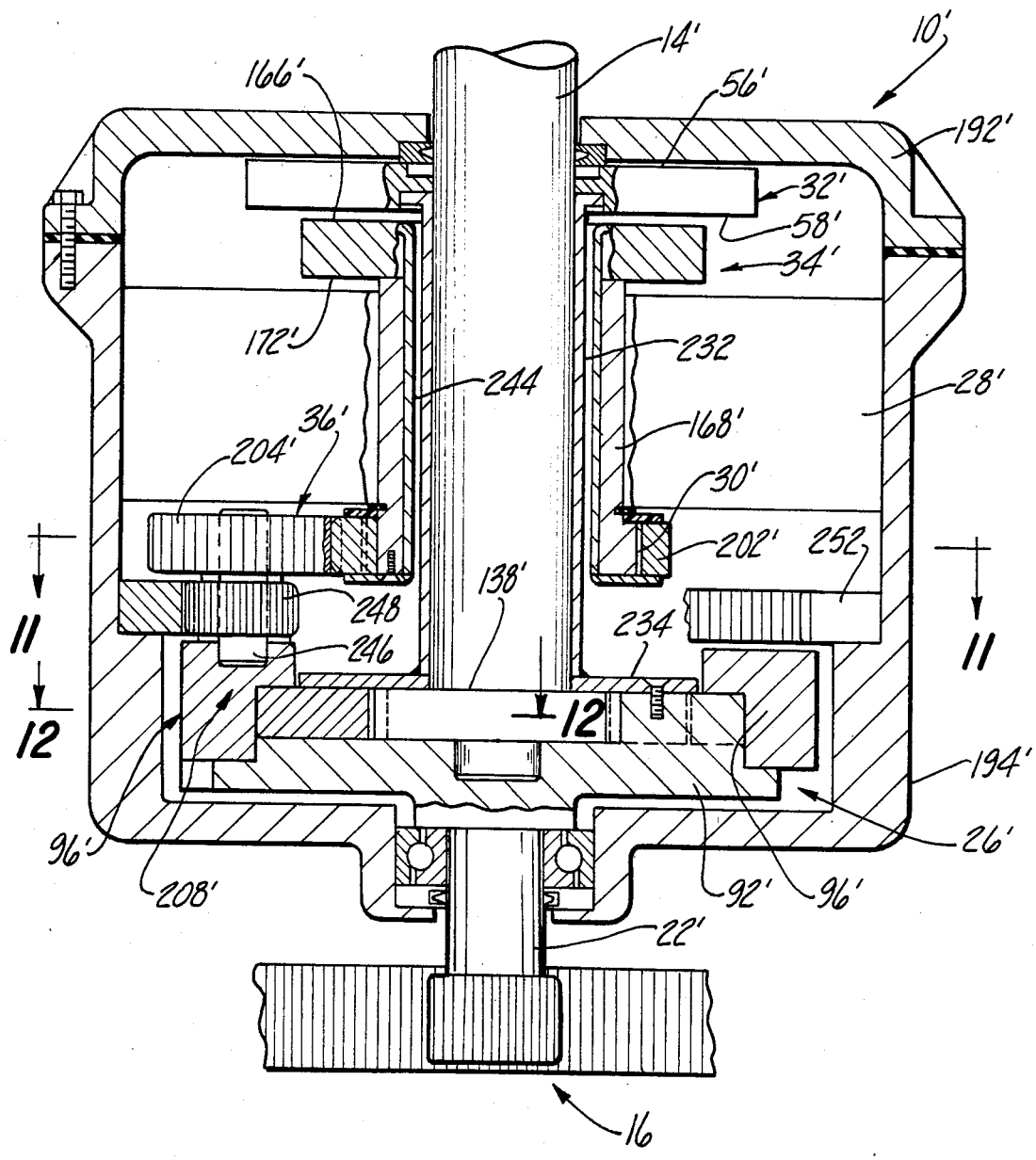
FIG. 10 is a cross-sectional view taken on lines 10—10 of FIG. 9.

As shown in FIGS. 10, 11 and 12, the power steering unit 10' comprises an upper housing member 192' and a lower housing member 194' which are bolted together to form a sealed unit. The upper shaft 14' from the steering wheel 12 enters the upper housing member 192' coaxially thereof. The shaft 22' exits the lower housing 194' in a coaxial arrangement and connects the power steering unit 10' with the steering gear 16.

First, the manual drive train through the power steering unit 10' will be described. This comprises the upper shaft 14' which terminates in the central actuator 138' of the drive transmitting coupling 26'. The torque transducer 32' has one input 56' connected with the shaft 14'. The other input 58' of the transducer 32' is connected with a tubular shaft 232 which, at its lower end, is connected with a cover plate 234 on the drive transmitting coupling 26'. The cover plate 234 is mounted on and rotates with the coupling block 92' which in turn, is connected with the shaft 22'.

The power drive train of the power steering unit 10' comprises the following arrangement. The servomotor 28' is disposed coaxially of the shaft 14' and includes a tubular servomotor shaft 168'. The servomotor 28' is mounted in the lower housing member 194'. The servomotor shaft 168' is drivingly connected with the sun gear 202' through a lost motion coupling 30'. The lost motion coupling 30' comprises a splined portion 176' of motor shaft 168' which is disposed in corresponding splines 178' on the inside diameter of the sun gear 202'. The lost motion transducer 34' has its input member 166' connected through a tubular shaft 244 with the sun gear and it has its other input member 172' connected with the motor shaft 168'.

In the planetary gear set 36', the sun gear meshes with the planetary gears 204' which are carried by respective stub shafts 246 mounted in the planetary carrier 208'. A set of smaller planetary gears 248 are unitary with gears 204' and preferably each is made of one piece of sintered metal. They mesh with a ring gear 252' which is fixedly mounted in the lower housing member 194'. Thus, the planetary gear set 36' functions as a speed reducing gear set with the sun gear 202' serving as the input member and the planetary carrier 208' serving as the output member. The planetary carrier 208' is unitary with a ring 96' of the drive transmitting coupling 26' and thus the carrier 208' and ring 96' correspond in function to the pinion 216 and ring gear 96 in the embodiment of FIGS. 2 through 6.

The operation of the power steering unit 10' is essentially the same as that of power steering unit 10 and will be understood from the foregoing description.

Although this invention has been described with reference to a particular embodiment, it is not to be construed in a limiting sense. Many variations and modifications will now occur in those skilled in the art. For a definition of the invention reference is made to the appended claims.

What is claimed is:

1. In a vehicle power steering system of the type comprising dirigible wheels, a manual input means, an electric servomotor, a steering gear, means for generating a torque signal corresponding to torque transmitted by said manual input means, and control means adapted to control energization of said servomotor in accordance with the torque signal, the improvement comprising:

restoring means responsive to turning of the dirigible wheels toward a straight ahead direction for controlling the energization of the servomotor to reduce its resistance to the turning of the dirigible wheels toward the straight ahead direction.

2. The invention as defined in claim 1 wherein said restoring means comprises:
   lost motion means for coupling said servomotor to said steering gear,
   means for generating a lost motion signal in response to lost motion in said lost motion means,
   said control means including means responsive to said lost motion signal for controlling energization of said servomotor whereby said servomotor is energized to reduce its resistance to the turning of the dirigible wheels toward the straight ahead direction.

3. The invention as defined in claim 2 wherein said servomotor is energized to an extent required to overcome its frictional losses when the torque signal is zero.

4. The invention as defined in claim 2 wherein said control means comprises:
   an amplifier,
   means for differentially combining said lost motion signal with said torque signal for developing a modified torque signal,
   and means for applying said modified torque signal to said amplifier for controlling energization of said servomotor.

5. The invention as defined in claim 2 wherein,
   said means for generating a lost motion signal comprises an angular motion to linear motion converter with a means for converting linear motion to an electric signal.

6. The invention as defined in claim 2 wherein,
   said means for generating a torque signal generates a torque signal that varies more rapidly near zero torque whereby lower driver input is required to compensate for output of said means for generating the lost motion signal.

7. The invention as defined in claim 2 wherein said lost motion signal varies directly with an extent of lost motion taken up by said lost motion means.

8. The invention as defined in claim 7 wherein the lost motion means has a lost motion travel which is small relative to one revolution of said servomotor.

9. The invention as defined in claim 2 including,
   speed reducing gear means connected between said servomotor and said steering gear and said means for generating a lost motion signal is responsive to lost motion between a shaft of said servomotor and an input member of said speed reducing gear means.

10. The invention as defined in claim 9 wherein,
    said speed reducing gear means comprises a planetary reduction gear means.

11. The invention as defined in claim 9 wherein,
    said means for generating a lost motion signal comprises an angular motion to linear motion converter with a means for converting linear motion to an electric signal.

12. The invention as defined in claim 11 wherein,
    said motion converter having an input element coupled with said shaft of the servomotor and having an input element coupled with the input member of said speed reducing gear means.

13. A vehicle power steering system comprising:
    a manual input shaft,
    an output means for driving a steering gear,
    an electric servo motor mounted coaxially with said manual input shaft and having a tubular output shaft operatively connected through speed reduction means to said output means,
    means for generating a torque signal corresponding to torque transmitted by said manual input shaft,
    control means adapted to control energization of said servomotor in accordance with the torque signal,
    a first displacement transmitting tubular shaft coaxial with and between the tubular output shaft and the manual input shaft operably connected with said output means for rotation therewith,
    said means for generating a torque signal being an angular displacement sensor with one input member operably connected for rotation with said manual input shaft and a remaining input member operably connected for rotation with said first displacement transmitting tubular shaft.

14. The invention as defined in claim 13 wherein,
    said speed reduction means comprises a planetary gear means.

15. The invention as defined in claim 13 including:
    dirigible wheels,
    lost motion means for coupling said servomotor to said stearing gear,
    means for generating a lost motion signal in response to lost motion in said lost motion means,
    said control means including means responseive to said lost motion signal for controlling the energization of said servomotor whereby said servomotor is energized to reduce its resistance to a turning of the dirigible wheels toward a straight ahead direction.

16. The invention as defined in claim 15 including:
    a second displacement transmitting shaft coaxial with and between said motor shaft and said first displacement transmitting shaft and operably connected with an input member of said speed reduction means for rotation therewith, said means for generating a lost motion signal being an angular displacement sensor with one input member operably connected for rotation with said motor shaft and a remaining input member operably connected for rotation with said second displacement transmitting shaft.

17. The invention as defined in claim 15 wherein said servomotor is energized to an extent required to overcome its frictional losses when the torque signal is zero.

18. The invention as defined in claim 15 wherein said control means comprises,
    an amplifier,
    means for differentially combining said lost motion signal with said torque signal for developing a modified torque signal,
    and means for applying said modified torque signal to said amplifier for controlling the energization of said servomotor.

19. The invention as defined in claim 15 wherein said lost motion signal varies directly with an extent of lost motion taken up by said lost motion means.

20. The invention as defined in claim 15 wherein the lost motion means has a lost motion travel which is small relative to one revolution of said servomotor.

21. The invention as defined in claim 15 wherein,
    said means for generating a torque signal generates a torque signal that varies more rapidly near zero torque whereby lower driver input is required to compensate for output of said means for generating the lost motion signal.

22. The invention as defined in claim 15 wherein, said means for generating a lost motion signal comprises an angular motion to linear motion converter with a means for converting linear motion to an electric signal.

23. The invention as defined in claim 22 wherein, said speed reduction means comprises a planetary gear set with a sun gear and planetary gears, one input member of said motion converter is attached by a tubular shaft with the sun gear of said planetary reduction gear and a remaining input member of said motion converter is connected with said shaft of the servomotor.

24. A vehicle power steering system comprising:
a manual input shaft,
an output means for driving a steering gear,
a driving means including a servomotor,
a clutch means adapted to couple said driving means with said output means for transmitting torque therebetween,
lost motion means adapted to couple said manual input shaft with said output means,
clutch operating means responsive to lost motion of said lost motion means for controlling engagement and disengagement of said clutch means,
signal generating means responsive to the lost motion of said lost motion means for generating a torque signal,
and control means coupled with said signal generating means for controlling energization of said servomotor in accordance with said torque signal.

25. The invention as defined in claim 24 wherein said clutch means comprises:
a first one-way clutch adapted to couple said driving means with said output means for transmitting driving effort in one direction,
and a second one-way clutch adapted to couple said driving means with said output means for transmitting driving effort in an opposite direction.

26. The invention as defined in claim 24 wherein, said signal generating means is an angular displacement sensor having an input member operatively connected for rotation with said manual input shaft and having another input member operatively connected for rotation with said output means.

* * * * *